(12) United States Patent
Leimann

(10) Patent No.: US 7,210,374 B2
(45) Date of Patent: May 1, 2007

(54) SUPPORT FOR GEAR BEARING ELEMENTS

(75) Inventor: Dirk-Olaf Leimann, Antwerp (BE)

(73) Assignee: Hansen Transmissions International NV, Antwerp (BE)

( * ) Notice: Subject to any disclaimer, the term of this patent is extended or adjusted under 35 U.S.C. 154(b) by 242 days.

(21) Appl. No.: 10/471,576

(22) PCT Filed: Mar. 12, 2002

(86) PCT No.: PCT/IB02/01808

§ 371 (c)(1),
(2), (4) Date: Apr. 16, 2004

(87) PCT Pub. No.: WO02/073070

PCT Pub. Date: Sep. 19, 2002

(65) Prior Publication Data
US 2004/0159181 A1 Aug. 19, 2004

(30) Foreign Application Priority Data
Mar. 12, 2001 (GB) ................................. 0106002.9

(51) Int. Cl.
F16H 57/04 (2006.01)
F16H 57/02 (2006.01)
(52) U.S. Cl. .................... 74/606 R; 184/11.1
(58) Field of Classification Search ............. 74/606 R, 74/607; 184/11.5, 11.1, 11.2, 11.3, 11.4, 184/13.1
See application file for complete search history.

(56) References Cited

U.S. PATENT DOCUMENTS

| 1,496,866 | A | | 6/1924 | Simpson et al. | |
|---|---|---|---|---|---|
| 1,560,827 | A | | 11/1925 | Gustav | |
| 1,794,432 | A | * | 3/1931 | Yonkese | 74/606 R |
| 2,600,912 | A | * | 6/1952 | Olson | 74/421 R |
| 4,297,906 | A | | 11/1981 | Costello | |
| 4,513,599 | A | * | 4/1985 | Harris | 72/238 |

FOREIGN PATENT DOCUMENTS

| DE | 31 47 853 | 6/1983 |
|---|---|---|
| EP | 0 219 240 | 4/1987 |
| EP | 0 547 395 | 6/1993 |

* cited by examiner

Primary Examiner—Thomas R. Hannon
Assistant Examiner—Justin Krause
(74) Attorney, Agent, or Firm—Young & Thompson

(57) ABSTRACT

A housing (40) for a gear unit, the housing being formed by a moulding process including casting, pressure casting, injection moulding or like processes. The housing (40) of the invention comprises housing walls and support for bearing elements of a gear shaft, the housing walls (47) and support (45, 46) being formed in a mould wherein the support (45, 46) is connected to a wall (47) of the housing (40) and extends from that wall (47) in a direction in which the housing is removed or demoulded from the mould. Further, a surface of the support may be shaped to provide elements to hold a liquid lubricant and elements to direct that lubricant to and/or from the bearing elements of a gear shaft.

2 Claims, 5 Drawing Sheets

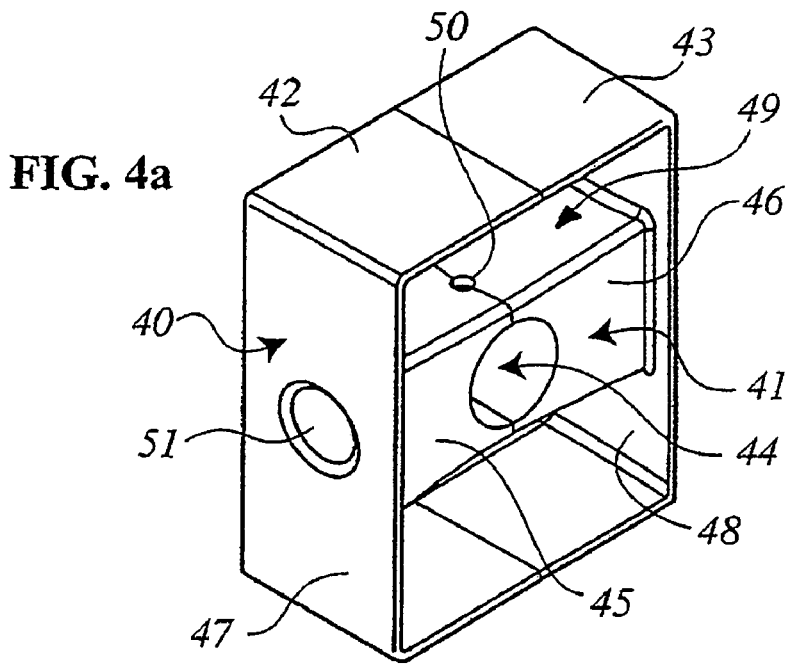
FIG. 4a
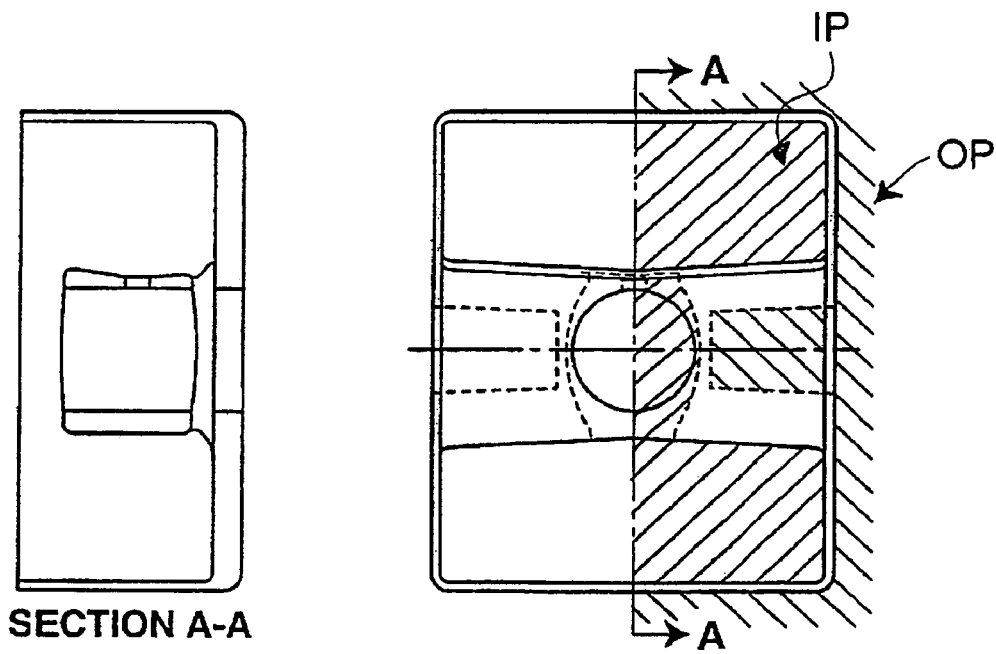
SECTION A-A
FIG. 4c
FIG. 4b
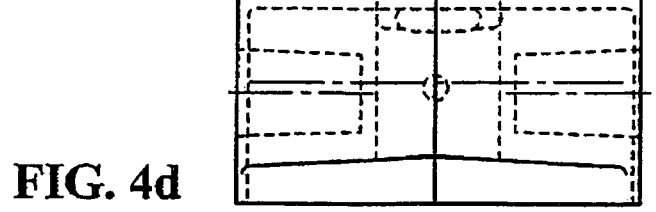
FIG. 4d

SECTION A-A

SECTION B-B

VIEW A-A

SUPPORT FOR GEAR BEARING ELEMENTS

BACKGROUND OF THE INVENTION

This invention relates to the support for a bearing arrangement in a housing formed by a casting, pressure casting, extrusion or injection moulding or like processes. Particularly but not exclusively the invention relates to the provision of supports for bearings for bevel or helical pinion shafts in a cast gear box housing in a so called flying gear design.

DESCRIPTION OF THE RELATED ART

For the provision of gear pinion shaft bearing support two possibilities are known. The first design is to cast the support directly in the housing whilst the other is to provide an extra bush or bearing housing which is connected to the main housing. These designs are shown respectively in FIGS. 1 and 2. Thus FIG. 1 shows a support 1 locating bearings 2,3 for a bevel gear pinion shaft 4, the support 1 being cast direr in the housing 5 whereas the configuration of FIG. 2 employs an extra bush or bearing housing 6 which is fixed to the main housing 5.

It is often required to provide bearings on a gear shaft in an angle design with lubrication. Lubrication may be achieved by various methods including directly by providing a bath of lubricant in which the gears run totally or partially immersed or indirectly by splashing lubricant within the gear housing. With direct immersion in a lubricant bath channels and holes are required in the bearings support or bush to permit necessary lubricant circulation whilst indirect lubrication requires collectors and supply channels or bores to be formed to return the lubricant.

One such prior bush support providing lubrication is shown in FIG. 3 wherein a lubricant splash indicated at 8 produced by a rotating gear 7 is collected in a shallow collecting bath 9 formed in the top of the bush. Holes 10 formed through the entire thickness of the upper part of the bush walls allow lubricant from the lubricant bath to fell under gravity through to the interior of the bush and thereby lubricate the shaft and bearing elements. Thereafter excess lubricant escapes from the bush interior by means of holes 12 provided through the bottom of the bush wall.

Regardless of the method of lubrication the formation of the necessary collectors, channels, holes and bores in a cast product complicates the design and increases the expense of manufacture. Formation of these internal features entirely during the casting process requires the use of extra mould cores making the castings more complicated thus increasing the expense and risk of defect. Where these features are alternatively formed subsequent to the casting operation, the post machining of the product adds to the manufacturing time and expense. Furthermore where the housing is of the unitary or monolithic construction internal machining is frequently not possible.

SUMMARY OF THE INVENTION

One object of the present invention is to provide support or bushing for bearing elements unitarily formed within a housing and having means for lubrication which is capable of manufacture by a material forming process such as casting or injection moulding avoiding or at least mitigating the above mentioned problems.

According to one aspect of the present invention a housing for a gear unit comprises housing watts and support for bearing elements of a gear unit pinion shaft, the housing walls and support being formed in a mould wherein the support is connected to a wall of the housing and extends from that wall in the direction in which the housing is demoulded from the forming mould.

BRIEF DESCRIPTION OF THE DRAWINGS

Further aspects of the present invention will become apparent from the following description of embodiments of the invention in conjunction with the following figures in which:

FIGS. 4 and 5 which show schematic drawings of a first embodiment of the invention.

DESCRIPTION OF THE PREFERRED EMBODIMENTS

Figure 1:
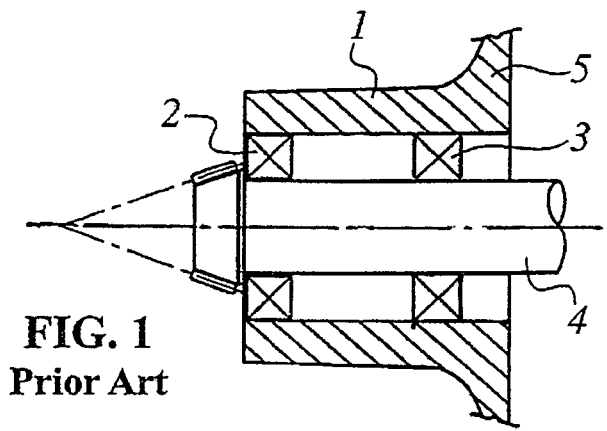
FIGS. 1 and 2 show schematic cross sectional diagrams of gear shaft bearings supports or bushes in an un-lubricated system.
Figure 2:
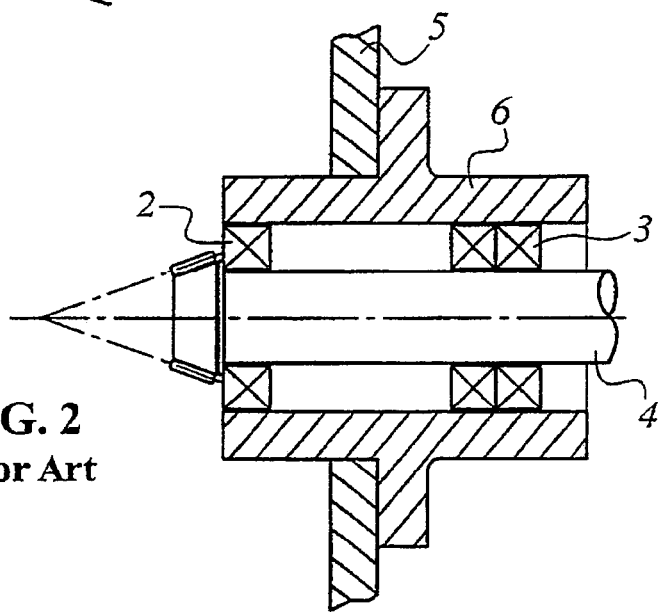
Figure 3:
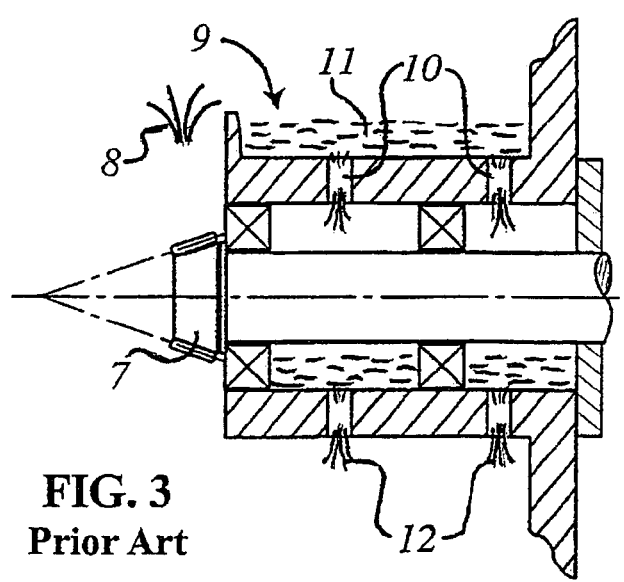
FIG. 3 shows a prior art support or bushing in a lubricated bearing configuration.
Figure 5A:
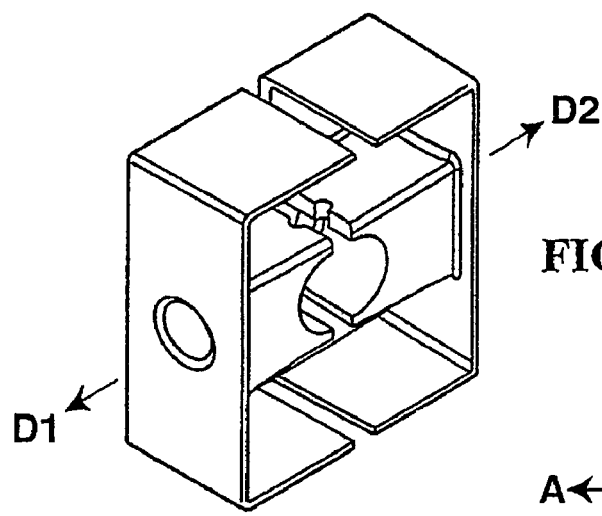
Figure 5C:
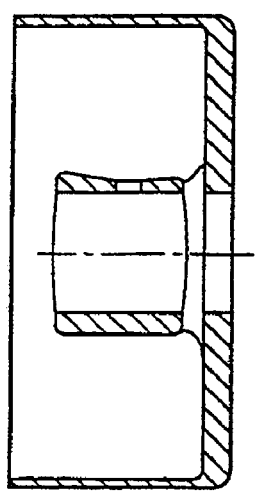
Figure 5B:
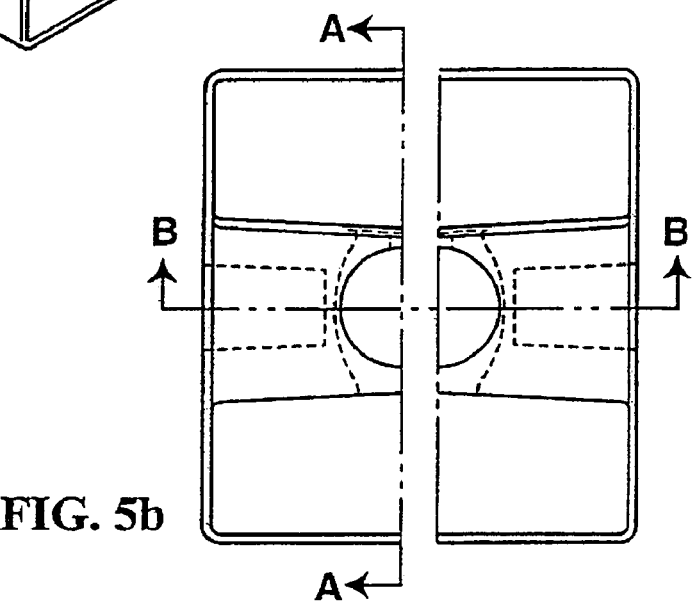
Figure 5D:
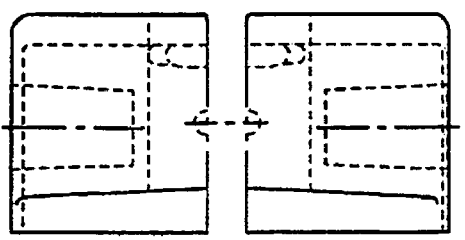
Figure 5E:
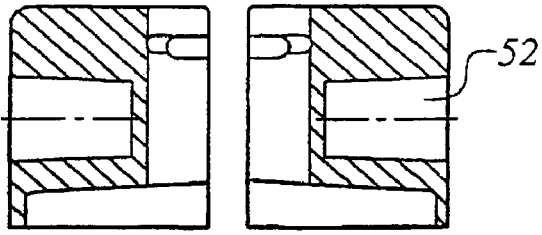

Shown in FIGS. 4 and 5 is a part of a cast gear housing 40. A bridge 41 extending longitudinally in a direction between opposite walls on the housing provides location and support for the bearings of a pinion shaft (not shown). The housing 40 and bridge support 41 are formed in two halves 42, 43 with each bridge half 45, 46 being cast integrally with its respective casing half 42, 43.

Each of the halves 42, 43 of the housing unit are cast separately and is a mirror image of the other with their plane of symmetry passing through the rotational axis of the gear shaft Details of their symmetry are shown in FIG. 5.

Accordingly the bridge support is formed in two halves 45, 46 whose interior mating surfaces together define a cylindrical hole 44 located at the center of the unit for supporting the gear shaft and bearing assembly. By interior mating surfaces of the bridge halves it will be understood that whilst the physical contact between the surface may be desirable it is not a necessity and that the surfaces may be spaced apart by a small distance consistent with providing the necessary location and support for the shaft bearings.

In each case the half bridge piece projects from and is connected to a wall of the housing which is perpendicular to the direction of demoulding of the casting. By the direction of demoulding is meant the direction in which the principle parts of the mould move apart or the direction of withdrawal of a shape-forming core to facilitate removal of the moulding or casting. This direction is normally perpendicular to the parting line of the mould. Thus bridge half 45 is connected to housing wall 47 and bridge half 46 is connected to housing wall 48 both housing walls being perpendicular to the direction in which the respective half castings were demoulded. Such directions are indicated by arrows D1 and D2 in FIG. 5A. Thus each of the bridge halves projects from its respective wall in the direction in which the casting or core was demoulded.

The housing shown in FIGS. 4 and 5 is designed to hold a horizontally extending gear shaft. Accordingly the upper-surface of the bridge 41 is dished in both directions. As is evident from the drawings the bridge halves each taper on their top and bottom surfaces and one side such that their overall cross sectional area decreases with increasing distance from their respective housing wall.

Such dimensional features facilitate demoulding of the half housing or core. According to this configuration the lowest region of the upper surface 49 of the bridge 41 is thus located directly above the rotational axis of the gear shaft along the plane of the mating surfaces of bridge portions 45, 46. At this point is provided a circular hole 50 formed half in each mating surface and extending from the upper surface of 49 of the bridge to and connecting with the cylindrical hole 44 directly below. The formation of semi-cylindrical impressions in each of the mating surfaces of the bridge halves to define the hole 50 may be accomplished by profiling of the mould wall without the necessity of using a separate core.

According to the above described configuration the upper surface 49 of the bridge 41 is formed with a shallow collector for collecting lubricant splashed upward by a rotating gear wheel and permits channeling of this lubricant via hole 50 to the pinion shaft bearings housed within the cylindrical hole 41.

The above described configuration of the gear housing 40 thus provides means for collecting and channeling lubricant to shaft bearings and comprises two halves 42, 43 which may be individually cast or formed without the necessity to use separate cores or post forming machining.

Cavities 51, 52 formed in the housing walls 47 and 48 respectively and each extending inwardly of the bridge portions 45, 46 may be provided to reduce material usage and weight.

Thus in accordance with the present invention the inner shape or profile of the casting and the outer shape or profile, as illustrated in FIG. 4B by the shaded regions IP and OP respectively, are formed separately by the shape of the mould. The inside shape IP may be formed by the mould or a mould core.

Figure 6:
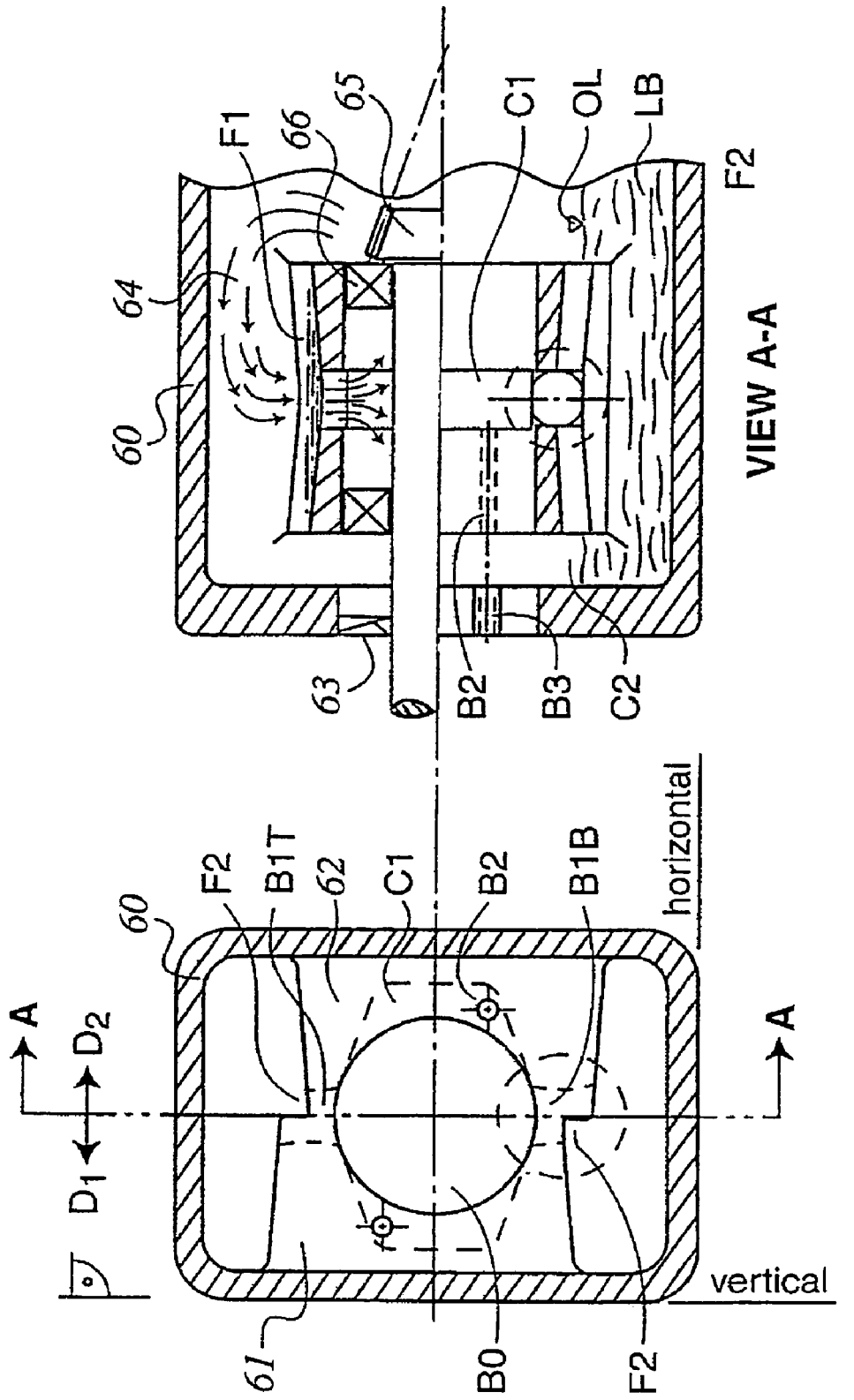
FIGS. 6 and 7 which show further embodiments and aspects of the invention.

Further aspects of the invention are shown in FIG. 6. Again bridge portions 61, 62 extend parallel to the direction of demoulding D1 and D2 from housing walls which are at right angles to these directions. The bridge portions define a hole BO for supporting the bearings. To collect liquid oil lubricant which splashes 64 up from the gear 65 rotating in lubricant LB, the bridge has collectors F1 for a horizontal mounting position and F2 for a vertical mounting position. The lubricant is channeled to the bearings 66 via the holes B1T at the top and/or B1B at the bottom. The hole B1B is optional for bath lubrication or other purposes. The lubricant oil level OL in the bearing support can, if required, be adjusted by the chamber C1 in combination with a machined hole B2. B3 is a bore or tapped hole to allow the machining of hole B2. It is presumed that the oil flow through the bearings is less than the oil available from the collectors F1 or F2 and the holes BIT or B1B. The design of FIG. 6 allows the housing 60 to be used in either vertical or horizontal orientation. Whilst allowing the lubricant via the chamber C2 to go from the bearing direct to the lubricant bath, the seal 63 can be any type and e.g. eithercontacting or non contacting the shaft. Again collectors F1 and F2 and lubricant channeling holes B1T and B1B expediently may be formed via features of the wall design of the primary mould parts without the conventional necessity to use separate core pieces.

Figure 7:
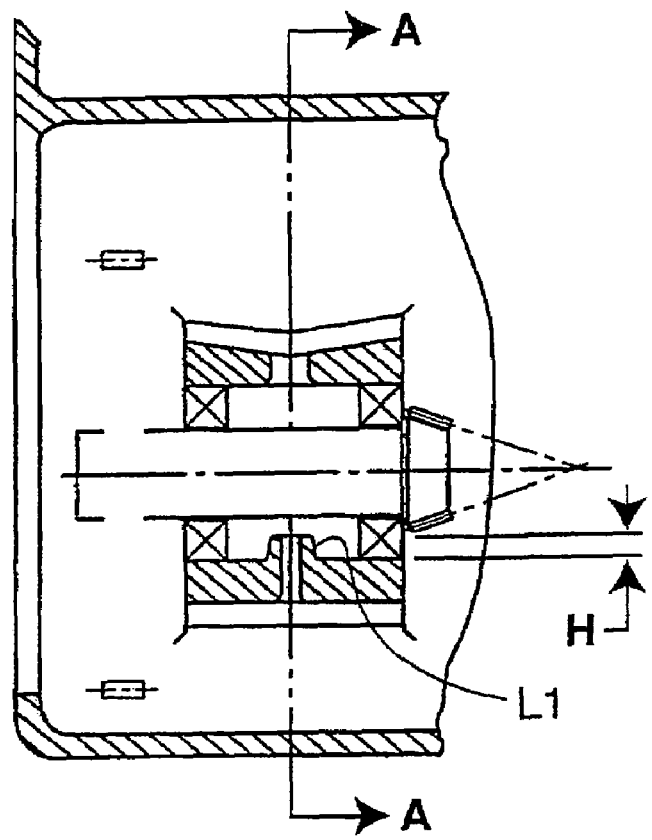
Figure 7:
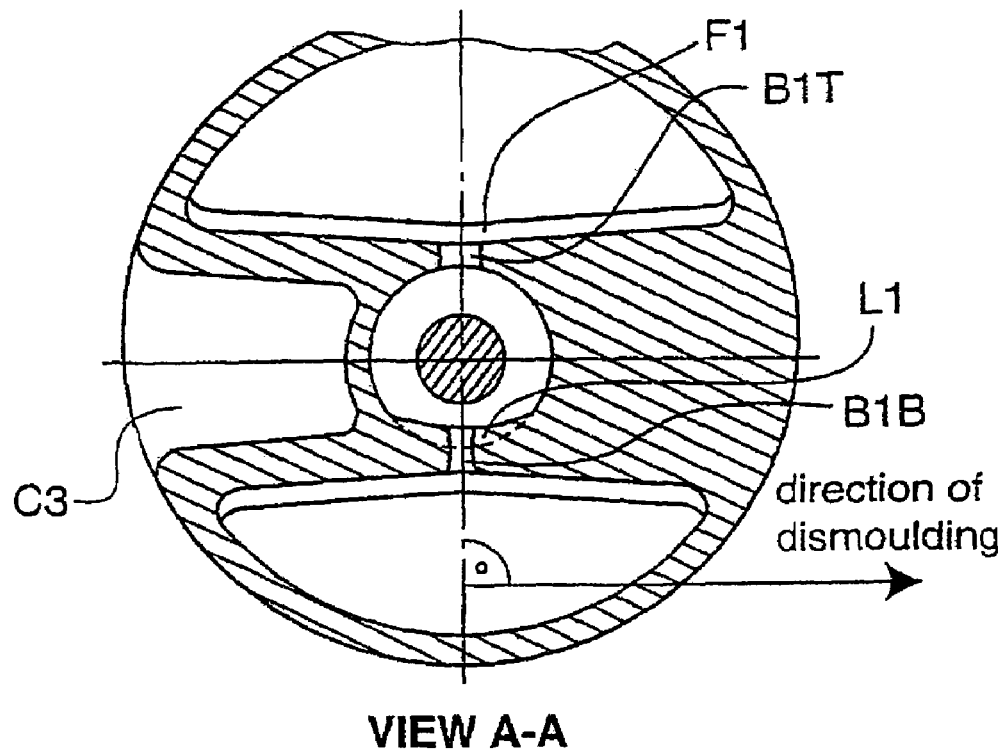

FIG. 7 shows an embodiment of the invention in a round housing with the further detail of a cast lip L1 surrounding the bottom drain hole B1B. Provision of the lip provides means for limiting the lubricant depth in which the bearings run to the height of the lip H above the surrounding portion of the bridge by ensuring that any excess lubricant is taken away through the bottom drainage hole B1B.

The invention claimed is:

1. A gear housing unit, comprising:
a monolithic cast gear first housing with a housing wall;
a monolithic cast gear second housing with a housing wall;
a bridge comprised of a first bridge half and a second bridge half, the bridge providing location and support for the bearings of a gear shaft with all gear elements being located outside any of the bearings supporting the gear elements;
the first bridge half extending horizontally in a direction from the housing wall of the first housing,
the second bridge half extending horizontally in a direction from the housing wall of the second housing,
a cylindrical hole formed at interior mating surfaces between the first and second bridge halves, the hole being located for supporting the gear shaft and bearing assembly;
a dish located in an upper surface of the first and second bridges, a lowest region of the upper surface of the bridge is located directly above a rotational axis of the gear shaft along the plane of mating surfaces of the first and second bridge halves;
a circular hole formed half in each of the mating surfaces and extending from the upper surface of the bridge to and connecting with the cylindrical hole; and
within the upper surface of the bridge, a collector for collecting lubricant splashed upward by a rotating gear wheel and permitting channeling of collected lubricant via the circular hole to the gear shaft bearings housed within the cylindrical hole.

2. A gear housing unit of claim 1, further comprising:
cavities formed in the housing walls of the first and second housings respectively,
the cavities each extending inwardly of the first and second bridge halves,
the cavities terminating adjacent the cylindrical hole.

* * * * *